United States Patent Office 3,795,656
Patented Mar. 5, 1974

3,795,656
ORGANOSILICON COMPOSITIONS CONTAINING AMMONIUM PLATINUM ADDUCTS
Eugene Ray Martin, Onsted, Mich., assignor to Stauffer Chemical Company, Westport, Conn.
No Drawing. Filed Jan. 2, 1973, Ser. No. 319,594
Int. Cl. C08f 11/04
U.S. Cl. 260—46.5 E                   23 Claims

ABSTRACT OF THE DISCLOSURE

Organosilicon compositions which contain ammonium platinum adducts. The compositions are prepared by reacting chloroplatinic acid with aminofunctional organosilicon compounds. These compositions are useful as catalysts for the addition of silicon bonded hydrogen groups to unsaturated organic compounds. The new catalysts have better solubility in the reaction media and are effective at very low concentrations.

---

The present invention relates to organosilicon compositions particularly to organosilicon compositions which contain ammonium platinum adducts.

Heretofore various platinum catalysts and complexes thereof have been used in the preparation of various organosilicon compounds. These platinum catalysts included compounds such as chloroplatinic acid, various titanium alkoxide complexes, platinum chloride-cyclopropane catalysts and various complexes derived by reacting alcohols, ethers and aldehydes with chloroplatinic acid and platinum on various carriers, etc., depending on the particular reaction involved. The addition reaction has been accomplished with varying degrees of success, for example, reactions catalyzed with platinized charcoal have required long reaction times, the yields of product have been low, and the products contain by-products which have presented difficulties.

Chloroplatinic acid is generally one of the more useful catalysts but it has certain disadvantages. For example, chloroplatinic acid is insoluble in many organic materials and is not always effective at low concentrations. These disadvantages led to the discovery of the formentioned organic platinum complexes. While these catalysts provide certain improvements over chloroplatinic acid, they have certain disadvantages. For example, the preparation of catalyst complexes, such as disclosed in U.S. Pat. No. 3,220,970 to Lamoreaux etc., require long reaction times at elevated temperatures. Also, the temperature is critical and if the temperature is allowed to go above the parameters described, then metallic platinum is obtained due to decomposition. Generally speaking, a number of addition reactions are best effected, irrespective of the catalyst, at temperatures well above the temperature parameters described in U.S. Pat. No. 3,220,970 to Lamoreaux for making the catalyst complex. Consequently the character of the platinum complex changes considerably under these conditions. Although these platinum complexes were more soluble than chloroplatinic acid in organic solvents, they are not sufficiently soluble in organosilicon compounds, especially organosilicon polymer systems where silicon bonded hydrogen groups are added to unsaturated organic compounds.

Therefore, it is an object of this invention to provide a novel catalyst. Another object of this invention is to provide a catalyst for effecting the addition of organosilicon compounds to unsaturated organic compounds. Still another object of this invention is to provide an organosilicon compound containing ammonium platinum adducts as catalysts for effecting the addition of silicon bonded hydrogen compounds to aliphatic unsaturated organic compounds. A further object of this invention is to provide a catalyst system which is soluble in organic solvents and is soluble in organosilicon compounds. A still further object of this invention is to provide a catalyst which is more effective at lower concentrations.

The foregoing objects and others which will become apparent from the following description are accomplished in accordance with this invention, generally speaking, by providing an organosilicon catalyst composition containing ammonium platinum adducts which may be prepared by reacting chloroplatinic acid with an aminofunctional silicon composition at a temperature of from 0 to 150° C. in the presence of a solvent, if desired. Generally it has been known that amines inhibit the catalytic activity of platinum catalysts. Surprisingly it has been found that an active catalyst can be synthesized by reacting an aminofunctional silicon composition with chloroplatinic acid, thus demonstrating the unexpected results of this new catalyst system.

More specifically the catalysts of this invention are prepared by reacting chloroplatinic acid with aminofunctional silicon compositions which may be prepared by mixing an organopolysiloxane with an aminofunctional silicon compound, such as amino-functional silanes or siloxanes and thereafter equilibrating the mixture in the presence of a catalyst. Organopolysiloxanes which may be used in the preparation of these aminofunctional silicon compositions are cyclic siloxanes of the general formula

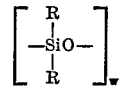

or linear or branched organopolysiloxanes having the general formula

in which R represents monovalent hydrocarbon radicals having up to 18 carbon atoms, $y$ is a number of from about 0.5 to 2.49, $z$ is a number of from 0.001 to 1 and the sum of $y$ and $z$ is a number of from 1 to 2.5 and $w$ is a number of from 3 to 10.

Radicals represented by R above are alkyl radicals, e.g., methyl, ethyl, propyl, butyl, octyl, dodecyl, and octadecyl; aryl radicals, e.g., phenyl, diphenyl and naphthyl radicals; alkenyl radicals, e.g., vinyl and allyl radicals; cycloalkyl radicals, e.g. cyclobutyl, cyclopentyl and cyclohexyl; alkaryl radicals, e.g. tolyl, xylyl, ethylphenyl; aralkyl radicals, e.g., benzyl, α-phenylethyl, β-phenylethyl and α-phenylbutyl.

Examples of suitable cyclic organopolysiloxanes which may be used in the formation of these aminofunctional silicon compounds are hexamethylcyclotrisiloxane,
hexaphenylcyclotrisiloxane,
1,2,3-trimethyl-1,2,3-triphenylcyclotrisiloxane,
1,2,3-trimethyl-1,2,3-trivinylcyclotrisiloxane,
octamethylcyclotetrasiloxane,
1,2,3,4-tetramethyl-1,2,3,4-tetravinylcyclotetrasiloxane
and the like.

Cyclic siloxanes in which $w$ has a value of from 3 to 4 are preferred.

Examples of linear or branched chained siloxanes which may be used are triorganosiloxy endblocked organopolysiloxanes such as trimethylsiloxy endblocked polydimethylsiloxanes, polydiethylsiloxanes, polymethylphenylsiloxanes, polydiphenylsiloxanes and copolymers thereof.

The aminofunctional silanes or siloxanes which are reacted with the organopolysiloxanes may be represented by the general formula

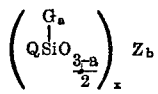

where G represents the radicals R, OR', OR'' NR$_2$ or OSiR$_3$ in which R is the same as R above, R' represents hydrogen or monovalent hydrocarbon radicals having from 1 to 18 carbon atoms, R'' is a divalent substituted or unsubstituted hydrocarbon radical having from 1 to 18 carbon atoms or a divalent substituted or unsubstituted hydrocarbonoxy radical in which the oxygen is in the form of an ether linkage or an unsaturated divalent substituted or unsubstituted hydrocarbon radical, Q represents the radicals

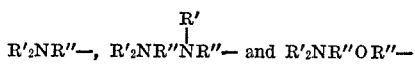

Z is a radical selected from the group consisting of R'O$_{0.5}$, R$_3$SiO$_{0.5}$, and R'$_2$NR''O$_{0.5}$, in which R, R' and R'' are the same as above, $a$ is a number of from 0 to 2, $b$ is a number of from 0 to 3, and $x$ is a number of from 1 to 20,000.

Examples of suitable divalent radicals represented by R'' are hydrocarbonradicals having from 1 to 18 carbon atoms, such as ethylene, trimethylene, tetramethylene, hexamethylene, octamethylene; hydrocarbonoxy radicals having the formulae (—OC$_2$H$_4$—)$_r$, (—OC$_2$H$_4$OCH$_2$—)$_r$, (—OC$_3$H$_6$—)$_r$, in which $r$ is a number of from 1 to 50, such as ethylene oxide, trimethylene oxide and polymers thereof and alkenylene radicals such as vinylene, propenylene, butenylene, hexenylene and the like.

Examples of suitable aminofunctional silanes are β-aminopropyltriethoxysilane, r - aminopropyltrimethoxysilane, methyl-β-(aminoethyl)-r-aminopropyldimethoxysilane, omega - aminohexyltributoxysilane, β-(aminoethoxy)-propyltrimethoxysilane, β-(aminoethoxy)-hexyltriethoxysilane, β-(aminopropoxy)-butyltributoxysilane, methyl - β - (aminopropoxy)-propyldi-(aminoethoxy)-silane,

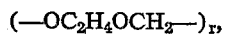

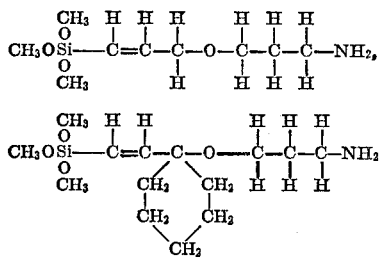

and the like.
Representative examples of aminofunctional siloxanes are

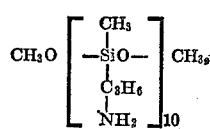

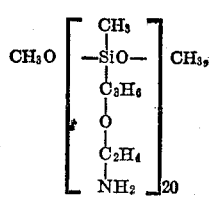

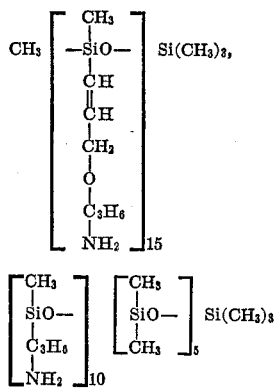

and the like.

The aminofunctional silicon compositions are prepared by equilibrating a mixture containing an aminofunctional silane or siloxane and an organopolysiloxane in the presence of a base catalyst.

Catalysts which may be employed in the equilibration reaction are bases such as hydroxides, e.g., sodium hydroxide, potassium hydroxide, lithium hydroxide, cerium hydroxide, tetramethyl ammonium hydroxide and the like; alkali metal alkoxides, e.g., lithium methoxide, lithium butoxide, sodium butoxide and the like; alkali metal hydrides, e.g., lithium hydride, sodium hydride and the like; silanoates, e.g., lithium silanoate, potassium silanoate, tetramethylammonium silanoate and the like; alkali metal alkyls, e.g., ethyllithium, ethylsodium, butyllithium; alkali metal alkenyls, e.g., vinyllithium; alkali metal aryls, e.g., biphenyl sodium, phenyllithium, potassium naphthalene, lithium naphthalene and the like. Even though other catalysts may be used, it is preferred that alkali metal hydroxides be employed in the equilibration reaction.

Although the amount of catalyst is not critical, it is preferred that from 0.0001 percent up to about 10 percent by weight of catalyst based on the weight of the aminofunctional silane or siloxane be employed to effect equilibration.

Generally, it is desirable to remove or destroy the catalysts after equilibration because their presence will adversely affect the properties of the resulting polymer. The catalysts may be removed, for example, by washing with water or they may be destroyed by neutralizing with acidic reagents. In addition, certain catalysts may be destroyed by heating the reaction mixture to elevated temperature after the equilibration reaction is completed.

The equilibration reactions may be conducted at any temperature ranging from about 25° C. up to about 200° C. over a period of time ranging from 0.5 hour up to several days in the presence or absence of a solvent. It is preferred that the equilibration reaction be conducted in an inert atmosphere.

Generally, it is preferred that the equilibration be conducted in the absence of a solvent; however, when lithium containing catalysts are used, then it is preferred that the equilibration be conducted in the presence of "aprotic" solvents.

The term "aprotic solvent" is intended to mean any organic solvent which is free of active protons. These may include such solvents as various tertiary amines, such as triethylamine, tributylamine, pyridine and the like. Other suitable solvents are dimethyl sulfoxides, dioxane, alkyl ethers; glycols, such as diethylene glycol diethyl ether, diethylene glycol dimethyl ether, diethoxyethane, tetrahydrofuran and the like. These solvents are chosen such that their electron donating centers are capable of forming a coordination complex with the cation, thereby increasing its reactivity towards the diorganocyclosiloxane. Aprotic solvents which have Lewis base characteristics are preferably employed because of their ability to donate electrons to the cation, thereby coordinating with the cation and enhancing its reactivity by virtue of such coordination.

Certain other hydrocarbon aprotic solvents which do not coordinate with the cation may be employed with the aprotic solvents described above to provide more intimate contact between the reactants. Examples of suitable hydrocarbon aprotic solvents are heptane, benzene, toluene, xylene, and the like. It is preferred that from 0.05 to about 10 percent of an aprotic solvent having a Lewis base characteristic be employed and the remainder of the solvent may be selected from the hydrocarbon aprotic solvents.

Other aminofunctional silicon compositions which may be reacted with chloroplatinic acid are copolymers which are prepared by reacting (polyaminoalkyl) alkoxysilanes of the formula

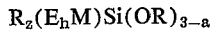

or the corresponding siloxanes with organosiloxanes of the general formula

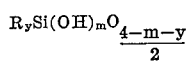

wherein R is the same as above, M is an aliphatic hydrocarbon radical having from 1 to 18 carbon atoms and having a valence of $h+1$, where $h$ is a number of from 1 to 3, E is a monovalent radical attached to M by a carbon-nitrogen bond and is composed of carbon, nitrogen and hydrogen atoms, $a$ is a number of from 0 to 2, $m$ has a positive average value up to and including 2, and $y$ is a number of from 0.5 to 2.49 and the sum of $m$ and $y$ has an average value up to and including 3.

These aminofunctional siloxane copolymers may be prepared by contacting the aminofunctional silanes or the corresponding siloxanes with the organosiloxane in a liquid phase in accordance with the procedure described in U.S. Pat. No. 3,355,424 to Brown. Generally the reaction will proceed rather slowly at room temperature, however, the reaction rate may be accelerated by heating the reaction mixture at temperatures of from 50° to about 200° C.

Other aminofunctional silicon compositions which may be reacted with chloroplatinic acid are tertiary aminoorganosilicon compounds which have at least one ether linkage in the organic group connecting the tertiary amino group to the silicon atoms. The tertiary aminoorganosiloxanes may be represented by the general formula

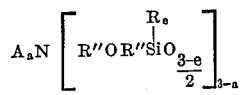

in which A is a monovalent hydrocarbon radical, a hydroxy terminated polyalkyleneoxy radical, an alkenyloxy terminated polyalkyleneoxy radical, a hydroxyalkyl radical, a tertiary aminoalkyl radical or a divalent radical which, together with the nitrogen atom forms a heterocyclic ring, R is a monovalent hydrocarbon radical, R'' is the same as above, $a$ is a number of from 0 to 2, and $e$ is a number of from 0 to 2.

These tertiary aminosiloxanes may be prepared by a platinum catalyzed addition reaction of an alkenyl ether of a tertiary hydroxyl-amine and a hydrosilicon compound (i.e., a silane or siloxane containing silicon-bonded hydrogen) in accordance with the procedure described in U.S. Pat. No. 3,402,191 to Morehouse. Generally temperatures of from 100° C. to about 160° C. are preferred and solvents for the reactants (e.g., alcohols such as ethanol, aromatic hydrocarbons, such as toluene and ethers such as ethylene glycol dimethyl ether) can be employed, particularly where the reactants are incompatible and/or it is desired to minimize crosslinking. It is preferred that the addition reaction be conducted under an atmosphere of an inert gas to minimize side reactions.

Other aminofunctional silicon compositions which may be reacted with chloroplatinic acid are those derived from the partial hydrolysis and condensation of a liquid silanol chain-stopped polydiorganosiloxane having the formula

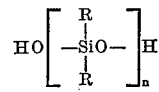

and an aminoalkoxyalkylsilane or an aminalkoxyalkenylsilane having the formula

and if desired, an aminoalkylsilane having the formula

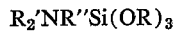

in which R, R', R'', and $n$ are the same as above. These amino-functional organopolysiloxane copolymers may be prepared in accordance with the procedure described in U.S. Pat. No. 3,544,498 to Holdstock et al. in which a mixture containing the silanol chain-terminated polyorganosiloxane and the aminoalkoxyalkylsilane or aminoalkoxyalkenylsilane and if desired, the aminoalkylsilane are partially hydrolyzed and condensed by adding the necessary amount of water to provide the degree of hydrolysis and condensation desired. Generally the amount of hydrolysis and condensation desired is that amount which will result in a copolymer having the desired viscosity and the desired alkoxy content. After the partial hydrolysis and condensation, the reaction mixture consists of the organopolysiloxane copolymer, free alcohol corresponding to the alkoxy group which is hydrolyzed from the silane by the water addition and water resulting from the condensation of the silanol groups. The water and alcohol can be left in the reaction mixture or it can be readily stripped therefrom at reduced pressures and at temperature ranging from room temperature up to 60° C. and more preferably at temperatures up to 40° C.

The chloroplatinic acid employed in this invention is a commercially available material and in its most available form, is chloroplatinic acid hexahydrate $$H_2PtCl_6 \cdot 6H_2O$$

However, the material can be used in the anhydrous form and it works equally as well as the hexahydrate.

More specifically the novel catalyst compositions obtained from the reaction of chloroplatinic acid and the amino-functional silanes or siloxanes may be represented by the formula

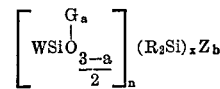

G, R and Z are groups previously defined; $a$, $b$, and $x$ are numbers as previously defined; $n$ is a number of from 1 to 20,000; W is an organic ammonium platinum adduct which can be further represented by the formulae

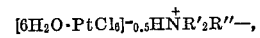

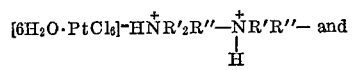

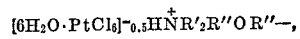

wherein R, R' and R'' are groups as previously defined, or the catalyst composition can consist of the organic ammonium platinum adducts of the aminofunctional organopolysiloxane compositions obtained by the base catalyzed equilibration described heretofore.

Examples of suitable solvents which can be employed in the preparation of the catalysts of this invention are dialkyl ethers, where the alkyl group has from 1 to 6 carbon atoms, such as diethyl ether, dibutyl ether and the like; cyclic ethers such as dioxane; alcohols having from 1 to 10 carbon atoms such as methanol, ethanol, propanol, butanol and decanol; aliphatic hydrocarbon solvents, such as pentane hexane, heptane; aromatic hydrocarbon solvents such as benzene, toluene, xylene naphtha and organopolysiloxane polymers and copolymers such as trimethylsilyl endblocked dimethylpolysiloxane polymers. It is preferred that at least 1 to 50 percent of the solvent be an alcohol such as methanol, ethanol or isopropanol.

The organosilicon compositions containing the ammonium platinum adducts are effective for the addition of an unlimited class of organosilicon compounds containing a silicon-hydrogen bond to an unlimited class of organic compounds having carbon-carbon unsaturation. The catalysts of this invention are effective for every addition reaction described in Pat. No. 2,823,218 to Speir et al., Pat. No. 2,970,150 to Bailey, and Pat. No. 3,220,970 to Amoreaux.

Suitable monomeric silicon compounds and organosilicon compounds containing silicon-hydrogen bonds which may be used in the practice of the present invention are those represented by the formula

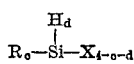

$$R_c\text{—}\underset{\underset{H_d}{|}}{Si}\text{—}X_{4-c-d}$$

wherein R is as defined heretofore; X is a radical selected from the class consisting of halogen, alkoxy radicals, aryloxy radicals and acyloxy (OOCR) radicals; $c$ is a number of from 0 to 3, $d$ is a number of from 1 to 3; and the sum of $c$ and $d$ is from 1 to 4. Where more than one R radical is present in the compound the various R radicals may be the same or different.

Among the radicals represented by R are alkyl radicals, e.g., methyl, ethyl, propyl, octyl, octadecyl and the like; cycloalkyl radicals such as cyclohexyl, cycloheptyl and the like; aryl radicals such as phenyl, naphthyl, tolyl, xylyl and the like; aralkyl radicals such as benzyl, phenylethyl and the like; haloaryl radicals and haloalkyl radicals such as chlorophenyl, chloro-methyl, dibromophenyl and the like. In the preferred embodiment, R is a methyl or a mixture of methyl and phenyl radicals.

Examples of suitable silicon compounds represented by the above formula which can be employed in the present invention are: methyldichlorosilane, phenyldichlorosilane, diethylchlorosilane, dimethylethoxysilane, diphenylchlorosilane, dichlorosilane, dibromosilane, pentachlorodisiloxane and the like.

Suitable silicon hydrogen containing compounds useful in the practice of the present invention are those in which each molecule contains at least one silicon hydrogen bond. Within this category are included organopolysiloxanes and various polysilalkylene compounds containing, for example, an —Si—Y—Si— linkage in which Y is a divalent hydrocarbon radical having from 1 to 8 carbon atoms or a nitrogen atom, such as organosilazanes, which are characterized by an —Si—N—Si— linkage in the polymer.

Suitable examples of organopolysiloxanes are polymers and copolymers containing up to one or more of the units having the formulae: $R_3SiO_{0.5}$, $R_2SiO$, $RSiO_{1.5}$ or $SiO_2$ along with at least one unit per molecule having the formulae: $RHSiO$, $R_2HSiO_{0.5}$, $HSiO_{1.5}$, $H_2SiO$ or $$RH_2SiO_{0.5}$$

wherein R is as previously defined. Any of the silicon hydrogen compounds described above, are operative in the practice of the present invention; however, it is preferred that the silicon hydrogen compound be an organopolysiloxane such as an organopolysiloxane $(RHSiO)_n$ or an organopolysiloxane polymer or copolymer having the formula $R_ySiH_zO_{4-y-z}$ wherein R is as previously defined; $n$, $y$ and $z$ are the same as defined above and the sum of $y$ and $z$ is a number equal to from 1 to 2.5.

Compounds containing carbon-to-carbon unsaturation, particularly unsaturated compounds containing olefinic or acetylinic unsaturation which can react with the compounds described above containing the silicon-hydrogen bond includes substantially all the aliphatically unsaturated compounds known in the art. Thus, the aliphatically unsaturated compounds can be monomeric or polymeric materials. They can contain only carbon and hydrogen or they may also contain another element or elements. Where the aliphatically unsaturated compounds contain an element other than carbon and hydrogen, it is preferred that the other element be oxygen, halogen, nitrogen, silicon or mixtures thereof. Aliphatically unsaturated compounds can contain a single pair of carbon atoms linked by multiple bonds. Among the many unsaturated hydrocarbons applicable to the present invention which can be mentioned for purposes of illustration are ethylene, propylene, butylene, octylene, styrene, butadiene, pentadiene, 2-pentene, 2-divinylbenzene, vinyl acetylene and the like. Preferably the unsaturated compound does not contain more than about 24 carbon atoms in the chain.

Included in the oxygen containing unsaturated compounds which may be employed in the practice of the invention are methylvinylether, divinylether and the like; the monoalkylethers of ethylene glycol, allyl aldehyde, methylvinyl ketone, phenylvinyl ketone, acrylic acid, methacrylate, phenylmethacrylate, vinylacetic acid, vinyl octoate, vinyl acetate, maleic acid, linoleic acid and the like. Other unsaturated compounds are cyclic and heterocyclic materials containing aliphatic unsaturation in the ring, such as, cyclohexene, cycloheptene, cyclopentadiene, dihydrofuran, dihydropyrene and the like. The sulfur analogues of the unsaturated oxygen containing materials may also be employed in the practice of this invention. In addition to compounds containing carbon, hydrogen, oxygen and sulfur, compounds containing other elements may also be employed. Thus, halogenated derivatives of any of the materials described above can be employed including the acyl chlorides as well as compounds containing a halogen substituent on a carbon atom. Thus, halogen containing materials include, for example, vinyl chloride, the vinyl chlorophenyl esters, the allyl esters of trichloroacetic acid and the like.

Other types of unsaturated materials which are useful in the practice of this invention include compounds containing nitrogen substituents such as acrylonitrile, allylcyanide, nitroethylene and the like. Unsaturated polymeric materials containing aliphatic unsaturation such as polyester resins prepared from polybasic saturated or unsaturated acids and polyhydric unsaturated alcohols may also be used in the practice of this invention.

Other unsaturated compounds which may be used in the practice of this invention are those compounds containing silicon such as the material commonly referred to as organosilicon monomers or polymers. The scope of the organosilicon compounds which are applicable to the process is identical to the scope of the silicon-hydrogen compounds useful in the practice of this invention. For example, the unsaturated organosilicon compounds are identical to the silicon-hydrogen compounds, except that the silicon bonded hydrogen is replaced by silicon bonded organic radicals containing at least one pair of aliphatic carbon atoms linked with multiple bonds. Although it is preferred that the organosilicon compounds be free of silicon bonded hydrogen atoms, organosilicon compounds containing both silicon bonded hydrogen atoms and silicon bonded unsaturated radicals may be used. The only requirement of these unsaturated silicon compounds is that there be at least one unsaturated organic radical attached to a silicon atom per molecule. Thus, the unsaturated organosilicon compounds include silanes, siloxanes, silazanes, as well as monomeric or polymeric materials containing silicon atoms joined together by methylene or polymethylene groups or by phenylene groups.

Examples of suitable unsaturated silicon compounds which may be used are methylvinyldichlorosilane, vinyltrichlorosilane, allyltrichlorosilane, methylphenylvinylchlorosilane, phenylvinyldichlorosilane, diallyldichlorosilane, vinylcyanoethyldichlorosilane, cyclic polysiloxanes such as the cyclic trimer of methylvinylsiloxane, cyclic tetramer of methylvinylsiloxane, cyclic pentamer or methylvinylsiloxane, cyclic tetramer of vinylphenylsiloxane and the like.

The ratio of the silicon-hydrogen compound and the unsaturated compound employed can vary within extremely wide limits. Generally, one silicon hydrogen bond is equivalent to one olefinic double bond or one-half acetylenic triple bond so that this equivalency establishes the general order of magnitude of the two reactants used. However, for many purposes it may be desirable to employ an excess of one of the reactants to facilitate the completion of the reaction or to insure that the reaction contains one or more pairs of carbon atoms linked by multiple bonds. In general, however, the ratio of the reactants are selected so that there are present from about 0.5 to 20 silicon-hydrogen linkages available for each unsaturated carbon-carbon double bond and from about 1.0 to 15 silicon hydrogen linkages for each carbon-carbon triple bond.

To effect the addition reactions of the organosilicon compositions in the presence of the ammonium platinum adducts, the reactants and catalyst are thoroughly mixed and the reaction mixture heated to the desired temperature which is generally of the order of from 50° to 150° C. and the reaction is allowed to go to completion. The time required for the addition reaction is a function of temperature. At a temperature of from 50° to 100° C. which is the preferred range, the reaction times can vary from a few minutes up to 4 or 5 hours or more depending upon the reactants involved.

In some cases, it is desirable to employ a solvent for one or both reactants. The amount of solvent employed is not critical and can vary over a wide range. Obviously, the same material may in some cases serve both as the reactant and as the solvent.

The amount of catalyst of this invention can vary within extremely wide limits. It is preferred that enough catalyst be employed to provide from $1 \times 10^{-10}$ moles of platinum per mole of olefin to $1 \times 10^{-1}$ moles of platinum per mole of olefin. Generally the economics of the reaction dictates the catalyst level employed.

One of the advantages of the novel catalysts of this invention is that they will effect the desired reaction between the silicon-hydrogen compound and the unsaturated compound in very small quantities.

The products prepared by the addition reactions of this invention have various utilities depending upon the particular product formed. Thus, the product formed from the reaction of a monomeric silane containing a silicon bonded hydrogen atom and a hydrolyzable group with an olefinic material, such as, for example, the reaction product obtained from the reaction of methyldichlorosilane with 1-octene may be hydrolyzed and condensed in conventional fashion to form various organopolysiloxanes which may be used as coating compositions and release agents.

Various embodiments of this invention are further illustrated in the following examples in which all parts are by weight unless otherwise specified.

EXAMPLE 1

An aminofunctional silicon composition is prepared by heating a mixture containing about 266.4 parts of octamethylcyclotetrasiloxane, 22.4 parts of β-(aminoethyl)-r-aminopropyltrimethoxysilane and 0.29 part of potassium hydroxide to a temperature of 145° C. for three hours. After cooling the liquid product to room temperature, 0.29 part of acetic acid is added to neutralize the catalyst. The product is filtered and a liquid product having a viscosity of about 40 cs. at 25° C. is recovered. Nuclear Magnetic Resonance analysis of the products shows the ratio of aminopropyl groups to OCH₃ to Me₂SiO groups is about 1:3:36.

About 15.4 parts of the aminofunctional silicon composition prepared above is added to a reactor under an atmosphere of nitrogen. About 78.4 parts of isopropanol, 1.6 parts of chloroplatinic acid hexahydrate, and 26.0 parts toluene are added to the reactor and the reaction mixture is stirred for 30 minutes at 27° C.

A portion of the catalyst solution is removed from the reactor and the solvent is distilled off at a temperature of about 30° C. at 0.25 mm. Hg pressure over a period of 4 hours. The resulting product is a transparent orange color. Infrared analysis confirms the presence of the ammonium ion. The product contains 3.0 weight percent of platinum as determined by wet analysis techniques.

EXAMPLE 2

About 28.8 parts of an aminofunctional dimethylpolysiloxane prepared in accordance with the procedure described above and having a ratio of N,β-(aminoethoxy)-r-aminopropyl groups to methoxy groups to (CH₃)₂SiO groups of 1:3:192 and a viscosity of 290 centistokes at 25° C. is added to a reactor under an atmosphere of nitrogen. About 1.04 parts of chloroplatinic acid hexahydrate, 19.8 parts of isopropanol and 21.8 parts of toluene are added to the reactor and the reaction mixture is stirred for 30 minutes at 30° C. The resulting solution is a transparent, orange colored liquid, which contains 0.56 weight percent of platinum.

EXAMPLE 3

The procedure of Example 2 is repeated, except that an aminofunctional dimethylpolysiloxane polymer of the formula

is substituted for the aminofunctional fluid. The aminofunctional polymer is prepared by condensing a silanol terminated fluid with N,β-(aminoethoxy)-r-aminopropyltrimethoxysilane. The catalyst prepared by this method can be represented by the formula

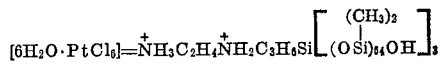

EXAMPLE 4

About 20.0 parts of the catalyst solution prepared in accordance with the procedure described in Example 3 is added to 40 parts of dimethylpolysiloxane fluid having a viscosity of 200 cs. at 25° C. The solvent is removed under vacuum (0.25 mm. Hg) at 30° C. over a period of about 6 hours. A transparent orange solution is obtained.

This example shows that the ammonium platinum adducts of this invention are soluble in dimethylpolysiloxane fluids.

EXAMPLE 5

To a reactor is charged 17.2 parts 1-hexene, 21.0 parts methyldichlorosilane and 0.2 part of the catalyst solution prepared in accordance with the procedure described in Example 1. The reaction mixture is heated to 150° C. over a period of about one hour, cooled to 40° C. and then vacuum distilled. The resulting product boils at a temperature of from 37° to 38° C. at 2 mm. Hg. About 27.2 parts of the product is identified by N.M.R. analysis, as hexylmethyldichlorosilane. Analysis by gas chromatography shows a purity of about 98.5 percent. The catalyst level employed in this example is about $2.51 \times 10^{-6}$ moles of platinum per mole of olefin.

EXAMPLE 6

The procedure of Example 5 is repeated, except that a chloroplatinic acid solution containing the same platinum level as used in Example 4 is substituted for the catalyst of Example 5. About 23.7 parts of a product identified as hexylmethyldichlorosilane is obtained. Analysis of the product by gas chromatography indicates a purity of about 97.2 percent. This example illustrates that the catalyst composition of this invention is more effective than chloroplatinic acid.

EXAMPLE 7

A sufficient amount of the solvent free catalyst composition prepared in accordance with the procedure of Example 1 is added to toluene to form a 13.5 percent catalyst solution. About 0.14 part of the toluene-catalyst solution, 17.2 parts 1-hexene, and 12.0 parts of trimethylsilyl endblocked methylhydrogenpolysiloxane is added to a reactor and the reaction mixture heated to 98° C. for about one hour. The volatile products are then removed at a temperature of 85° C. at 2 mm. Hg for 1 hour. Analysis of the product indicates that about 93.4 percent of the initial =SiH groups are added to the 1-hexene. The catalyst level is about $1.9 \times 10^{-5}$ moles of platinum per mole of olefin.

EXAMPLE 8

The procedure of Example 7 is repeated except the reaction mixture is heated to a temperature of 95° C. for about three hours. Essentially 100 percent of the =SiH groups added to the 1-hexene.

EXAMPLES 9 THRU 20

Several different silanes and olefins were mixed with the catalyst prepared in accordance with the procedure of Example 1 and heated to temperatures of from 60 to 85° C. for about three hours. The following table illustrates the results:

TABLE

| Example number | Olefin | Silicon hydrogen compound | Addition product | Percent addition |
|---|---|---|---|---|
| 9 | 1-hexene | Methyldimethoxysilane | Methylhexyldimethoxysilane | 93 |
| 10 | 1-octene | Triethoxysilane | Octyltriethoxysilane | 90 |
| 11 | 1-tetradecene | Dimethylmethoxysilane | Tetradecyldimethylmethoxysilane | 87 |
| 12 | 1-decene | Trichlorosilane | Decyltrichlorosilane | 89 |
| 13 | Vinyltriethoxysilane | Triethoxysilane | Triethoxysilylethyltriethoxysilane | 85 |
| 14 | 1-heptene | Triacetoxysilane | Heptyltriacetoxysilane | 75 |
| 15 | 1-eicosene | Ethyldimethoxysilane | Eicosylethyldimethoxysilane | 80 |
| 16 | 1-pentene | Dimethylsilane | Dipentyldimethylsilane | 82 |
| 17 | 1-dodecene | Propyldibutoxysilane | Dodecylpropyldibutoxysilane | 85 |
| 18 | Allylchloride | Methyldimethoxysilane | 3-chloropropylmethyldimethoxysilane | 65 |
| 19 | do | Triethoxysilane | 3-chloropropyltriethoxysilane | 70 |
| 20 | do | Tributylsilane | 3-chloropropyltributylsilane | 72 |

EXAMPLE 21

A trimethylsilyl endblocked methylvinylpolysiloxane fluid is prepared by conventional techniques known in the art from hexamethyldisiloxane, octylmethylcyclotetrasiloxane and the cyclic tetramer of methylvinylsiloxane. This fluid contains 0.8 weight percent vinyl groups and has a viscosity of about 3,000 centistokes at 25° C. A methylhydrogenpolysiloxane fluid is prepared by the cohydrolysis of methyldichlorosilane and dimethyldichlorosilane in amounts sufficient to provide 1 methylhydrogensiloxane unit per 10 dimethylsiloxane units. A mixture is prepared containing about 50 parts of the methylvinylpolysiloxane fluid, 10 parts of the methylhydrogenpolysiloxane fluid, and 0.10 part of the catalyst composition prepared in accordance with the procedure described in Example 2. The mixture is heated to 110° C. until a rubber-like polymer is formed. The resulting polymer cures to an elastomeric material in about 15 minutes.

EXAMPLE 22

The procedure of Example 21 is repeated except that 0.10 part of the catalyst solution prepared in accordance with the procedure of Example 3 is employed. Essentially the same results are obtained as in Example 21.

Although specific examples of the invention have been described herein, it is not intended to limit the invention solely thereto, but to include all the variations and modifications falling within the spirit and scope of the appended claims.

What is claimed is:

1. Platinum containing organosilicon compositions of the formula

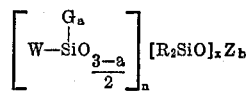

in which G is a radical selected from the group consisting R, OR′, OR″NR$_2$ and OSiR$_3$; Z is a radical selected from the group consisting of R′O$_{0.5}$, R$_3$SiO$_{0.5}$ and R′$_2$NR″O$_{0.5}$; W is an ammonium platinum adduct selected from the group consisting of

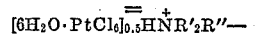

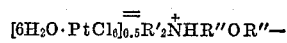

and $[6H_2O \cdot PtCl_6]_{0.5} R'_2 \overset{+}{N} HR''OR''-$

R is a monovalent hydrocarbon radical having up to 18 carbon atoms; R′ is selected from the group consisting of hydrogen and monovalent hydrocarbon radicals having up to 18 carbon atoms; R″ is a divalent radical selected from the group consisting of substituted and unsubstituted hydrocarbon radicals having up to 18 carbon atoms, substituted and unsubstituted hydrocarbonoxy radicals in which the oxygen is in the form of an ether linkage and unsaturated substituted and unsubstituted hydrocarbon radicals, $a$ is a number of from 0 to 2, $b$ is a number of from 0 to 3, $n$ and $x$ are each numbers of from 1 to 20,000.

2. The compositions of claim 1 wherein W represents an ammonium platinum adduct of the formula

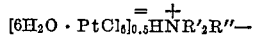

in which R′ is selected from the group consisting of hydrogen and monovalent hydrocarbon radicals having up to 18 carbon atoms; R″ is a divalent radical selected from the group consisting of substituted and unsubstituted hydrocarbon radicals having up to 18 carbon atoms, substituted and unsubstituted hydrocarbonoxy radicals in which the oxygen is in the form of an ether linkage and unsaturated substituted and unsubstituted hydrocarbon radicals.

3. The compositions of claim 1 wherein W represents an ammonium platinum adduct of the formula

in which R′ is selected from the group consisting of hydrogen and monovalent hydrocarbon radicals having up to 18 carbon atoms; R″ is a divalent radical selected from the group consisting of substituted and unsubstituted hydrocarbon radicals having up to 18 carbon atoms, substituted and unsubstituted hydrocarbonoxy radicals in which the oxygen is in the form of an ether linkage and unsaturated substituted and unsubstituted hydrocarbon radicals.

4. The compositions of claim 1 wherein W represents an ammonium platinum adduct of the formula

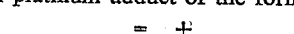

in which R' is selected from the group consisting of hydrogen and monovalent hydrocarbon radicals having up to 18 carbon atoms; R'' is a divalent radical selected from the group consisting of substituted and unsubstituted hydrocarbon radicals having up to 18 carbon atoms, substituted and unsubstituted hydrocarbonoxy radicals in which the oxygen is in the form of an ether linkage and unsaturated substituted and unsubstituted hydrocarbon radicals.

5. A method for preparing the compositions of claim 1 which comprises reacting chloroplatinic acid with the product obtained from the condensation of an organopolysiloxane and an aminofunctional silane at a temperature of from 0 to 150° C., said product is obtained from the condensation of an organopolysiloxane of the formula

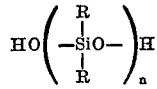

and an aminofunctional silane of the formula $$R_2'NR''OR''Si(OR)_3$$

in which R is selected from the group consisting of monovalent hydrocarbon radicals having up to 18 carbon atoms; R' is selected from the group consisting of hydrogen and monovalent hydrocarbon radicals having up to 18 carbon atoms; R'' is a divalent radical selected from the group consisting of substituted and unsubstituted hydrocarbon radicals having up to 18 carbon atoms; substituted and unsusbstituted hydrocarbonoxy radicals in which the oxygen is in the form of an ether linkage, and unsaturated substituted and unsubstituted hydrocarbon radicals and $n$ is a number of from 1 to 20,000.

6. A method for preparing the compositions of claim 1 which comprises reacting chloroplatinic acid with the product obtained from the reaction of an organopolysiloxane and an aminofunctional silicon compound at a temperature of from 0 to 150° C., said product is obtained from the reaction of an organopolysiloxane of the general formula $$R_ySi(OH)_mO_{\frac{4-m-y}{2}}$$

and an aminofunctional silicon compound selected from the class consisting of (polyaminoalkyl) alkoxysilanes of the formula $$R_a(E_hM)Si(OR)_{3-a}$$

and the corresponding siloxanes in which R is a monovalent hydrocarbon radical having up to 18 carbon atoms; M is an aliphatic hydrocarbon radical having up to 18 carbon atoms and having a valence of $h+1$ where $h$ is a number of from 1 to 3; E is a monovalent radical attached to M by a carbon-nitrogen bond and is composed of carbon, hydrogen and nitrogen atoms; $a$ is a number of from 0 to 2; $m$ has a positive average value up to and including 2, $y$ is a number of from 0.5 to 2.49 and the sum of $m+y$ has an average value up to and including 3.

7. A method for preparing a platinum containing organosilicon composition which comprises reacting chloroplatinic acid with an aminofunctional silicon composition at a temperature of from 0 to 150° C., said aminofunctional silicon composition is obtained from the equilibration of an aminofunctional silicon compound of the general formula

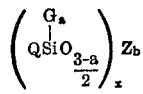

and an organopolysiloxane fluid selected from the group consisting of cyclic siloxanes of the formula

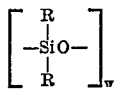

and linear or branched siloxanes of the formula $$R_ySiR_2O_{4-y-z}$$

in which R is a monovalent hydrocarbon radical having up to 18 carbon atoms; G is a radical selected from the group consisting of R, OR', OR''NR_2 and OSiR_3; Q is a radical selected from the group consisting of R'_2NR''—, R'_2NR''NR'R''— and R'_2NR''OR''—; Z is a radical selected from the group consisting of R'O_{0.5}, R_3SiO_{0.5} and R'_2NR''O_{0.5}; R is the same as above; R' is selected from the group consisting of hydrogen and monovalent hydrocarbon radicals having up to 18 carbon atoms; R'' is a divalent radical selected from the group consisting of substituted and unsubstituted hydrocarbon radicals having up to 18 carbon atoms, substituted and unsubstituted hydrocarbonoxy radicals in which the oxygen is in the form of an ether linkage and unsaturated substituted and unsubstituted hydrocarbon radicals; $a$ is a number of from 0 to 2, $b$ is a number of from 0 to 3, $w$ is a number of from 3 to 10, $x$ is a number of from 1 to 20,000, $y$ is a number of from about 0.5 to 2.49, $z$ is a number of from 0.001 to 1.0 and the sum of $y$ and $z$ is a number of from 1.0 to 2.5 in the presence of a base catalyst and at a temperature of from about 25° C. up to about 200° C.

8. The method of claim 7 wherein the organopolysiloxane is a cyclic siloxane.

9. A method for preparing organosilicon compounds containing carbon-silicon bonds which comprises reacting a silicon compound containing at least one ≡Si—H bond per molecule with an organic compound containing aliphatic unsaturation in the presence of a catalytic amount of an ammonium platinum adduct of an organosilicon composition having the formula

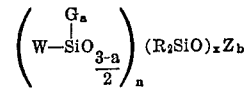

in which G is a radical selected from the group consisting of R, OR', OR'' NR_2 and OSiR_3; Z is a radical selected from the group consisting of R'O_{0.5}, R_3SiO_{0.5} and $$R'_2NR''O_{0.5};$$

W is an ammonium platinum adduct selected from the group consisting of

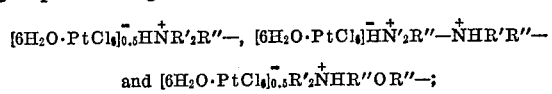

and $[6H_2O \cdot PtCl_4]_{0.5}R'_2\overset{+}{N}HR''OR''—$;

R is a monovalent hydrocarbon radical having up to 18 carbon atoms; R' is selected from the group consisting of hydrogen and monovalent hydrocarbon radicals having up to 18 carbon atoms; R'' is a divalent radical selected from the group consisting of substituted and unsubstituted hydrocarbon radicals having up to 18 carbon atoms, substituted and unsubstituted hydrocarbonoxy radicals in which the oxygen is in the form of an ether linkage and unsaturated substituted and unsubstituted hydrocarbon radicals, $a$ is a number of from 0 to 2, $b$ is a number of from 0 to 3, $n$ and $x$ are each numbers of from 1 to 20,000 at a temperature of from 50° to 150° C.

10. The method of claim 9 wherein W represents an ammonium platinum adduct of the formula

in which R' is selected from the group consisting of hydrogen and monovalent hydrocarbon radicals having up to 18 carbon atoms; R'' is a divalent radical selected from the group consisting of substituted and unsubstituted hydrocarbon radicals having up to 18 carbon atoms, substituted and unsubstituted hydrocarbonoxy radicals in which the oxygen is in the form of an ether linkage and unsaturated substituted and unsubstituted hydrocarbon radicals.

11. The method of claim 9 wherein W represents an ammonium platinum adduct of the formula

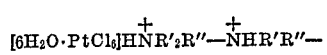

in which R' is selected from the group consisting of hydrogen and monovalent hydrocarbon radicals having up to 18 carbon atoms; R'' is a divalent radical selected from the group consisting of substituted and unsubstituted hydrocarbon radicals having up to 18 carbon atoms, substituted and unsubstituted hydrocarbonoxy radicals in which the oxygen is in the form of an ether linkage and unsaturated substituted and unsubstituted hydrocarbon radicals.

12. The method of claim 9 wherein W represents an ammonium platinum adduct of the formula $$[6H_2O \cdot PtCl_6]_{0.5}R'_2\overset{+}{N}HR''OR''-$$

in which R' is selected from the group consisting of hydrogen and monovalent hydrocarbon radicals having up to 18 carbon atoms; R'' is a divalent radical selected from the group consisting of substituted and unsubstituted hydrocarbon radicals having up to 18 carbon atoms, substituted and unsubstituted hydrocarbonoxy radicals in which the oxygen is in the form of an ether linkage and unsaturated substituted and unsubstituted hydrocarbon radicals.

13. The method of claim 9 wherein the organosilicon compounds are prepared in the presence of an ammonium platinum adduct which is obtained from the reaction of chloroplatinic acid and an aminofunctional silicon composition, said aminofunctional silicon composition is obtained from the equilibration of an aminofunctional silicon compound of the general formula $$\left( Q\overset{Ga}{\underset{|}{Si}}O_{\frac{3-a}{2}} \right)_x Z_b$$

and an organo polysiloxane fluid selected from the group consisting of cyclic siloxanes of the formula $$\left[ \begin{array}{c} R \\ | \\ -SiO- \\ | \\ R \end{array} \right]_w$$

and linear or branched siloxanes of the formula $$R_ySiR_zO_{4-y-z}$$

in which R is a monovalent hydrocarbon radical having up to 18 carbon atoms; G is a radical selected from the group consisting of R, OR', OR''NR$_2$ and OSiR$_3$; Q is a radical selected from the group consisting of R'$_2$NR''—, R'$_2$NR''NR'R''— and R'$_2$NR''OR''—; Z is a radical selected from the group consisting of R'O$_{0.5}$, R$_3$SiO$_{0.5}$ and R'$_2$NR''O$_{0.5}$; R is the same as above; R' is selected from the group consisting of hydrogen and monovalent hydrocarbon radicals having up to 18 carbon atoms; R'' is a divalent radical selected from the group consisting of substituted and unsubstituted radicals having up to 18 carbon atoms, substituted and unsubstituted hydrocarbonoxy radicals in which the oxygen is in the form of an ether linkage and unsaturated substituted and unsubstituted hydrocarbon radicals; $a$ is a number of from 0 to 2, $b$ is a number of from 0 to 3, $w$ is a number of from 3 to 10, $x$ is a number of from 1 to 20,000, $y$ is a number of from 0.5 to 2.49, $z$ is a number of from 0.001 to 1.0 and the sum of $y$ and $z$ is a number of from 1.0 to 2.5 in the presence of a base catalyst and at a temperature of from about 25° C. up to about 200° C.

14. The method of claim 13 wherein the organopolysiloxane fluid used in the equilibration reaction is a cyclic siloxane.

15. The method of claim 9 wherein the organosilicon compounds are prepared in the presence of an inert organic solvent.

16. The method of claim 9 wherein the organic compound is a silicon compound containing at least one unsaturated hydrocarbon radical.

17. The method of claim 16 wherein the silicon compound contains a vinyl radical.

18. The method of claim 19 wherein organic compound contains an olefinic radical.

19. The method of claim 16 wherein the silicon compound is represented by the formula $$R_cSi(H)_dX_{4-c-d}$$

in which R is a monovalent hydrocarbon radical having from 1 to 18 carbon atoms; X is a radical selected from the class consisting of halogen, alkoxy radicals, aryloxy radicals and acyloxy radicals; $c$ is a number of from 0 to 3, $d$ is a number of from 1 to 3 and the sum of $c+d$ is a number of from 1 to 4.

20. The method of claim 16 wherein the silicon compound is represented by the formula $$(R)_ySi(H)_z(O)_{4-y-z}$$

wherein R is a monovalent hydrocarbon radical having from 1 to 18 carbon atoms, $y$ is a number of from 0.5 to 2.49, $z$ is a number of from 0.001 to 1.0 and the sum of $y$ and $z$ is a number of from 1.0 to 2.5.

21. The method of claim 20 wherein the organic compound is a silicon compound containing at least one unsaturated aliphatic radical.

22. The method of claim 13 wherein the equilibration reaction is conducted in the presence of a lithium containing catalyst and an aprotic solvent.

23. A method for preparing the compositions of claim 1 which comprises reacting chloroplatinic acid with an aminoorganosiloxane of the general formula $$A_a\left[ NR''OR''\overset{R_e}{\underset{|}{Si}}O_{\frac{3-e}{2}} \right]_{3-a}$$

in which A is a radical selected from the group consisting of a monovalent hydrocarbon radical, a hydroxy terminated polyalkyleneoxy radical, an alkenyloxy terminated polyalkyleneoxy radical, a hydroxyalkyl radical, a tertiary aminoalkyl radical and a divalent radical which together with the nitrogen atom forms a heterocyclic ring; R is a monovalent hydrocarbon radical having up to 18 carbon atoms, R'' is a divalent radical selected from the group consisting of substituted and unsubstituted hydrocarbon radicals having up to 18 carbon atoms, substituted and unsubstituted hydrocarbonoxy radicals in which the oxygen is in the form of an ether linkage and unsaturated substituted and unsubstituted hydrocarbon radicals, $a$ and $e$ are each numbers of from 0 to 2, at a temperature of from 0 to 150° C.

References Cited
UNITED STATES PATENTS

| | | | |
|---|---|---|---|
| 3,723,567 | 3/1973 | Mink et al. | 260—825 |
| 3,419,593 | 12/1968 | Willing | 260—448.2 |
| 3,474,123 | 10/1969 | Kelly et al. | 260—448.2 |
| 3,715,334 | 2/1973 | Karstedt | 260—46.5 UA |

DONALD E. CZAJA, Primary Examiner

M. I. MARQUIS, Assistant Examiner

U.S. Cl. X.R.

260—46.5 UA, 429 R, 448.2 N, 825